Figure 1:
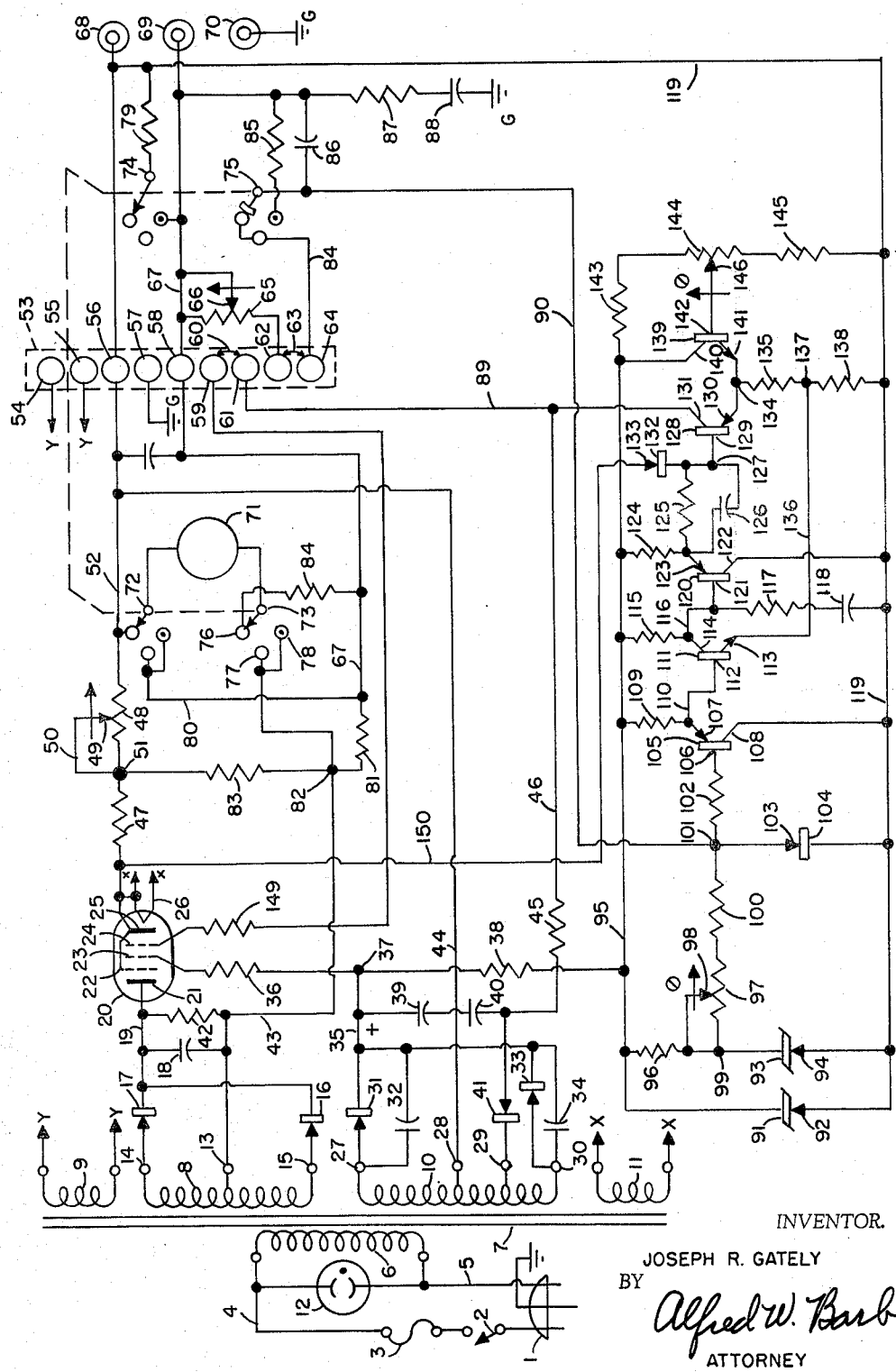

INVENTOR.
JOSEPH R. GATELY
BY
Alfred W. Barber
ATTORNEY

INVENTOR.
JOSEPH R. GATELY
BY
Alfred W. Barber
ATTORNEY

United States Patent Office 3,243,690
Patented Mar. 29, 1966

3,243,690
VOLTAGE REGULATED POWER SUPPLY WITH ADJUSTABLE CURRENT LIMIT
Joseph R. Gately, Woodside, N.Y., assignor to Forbro Design Corp., New York, N.Y., a corporation of New York
Filed Apr. 19, 1962, Ser. No. 188,805
6 Claims. (Cl. 323—22)

The present invention concerns voltage regulated power supplies and, in particular, power supplies with regulated output voltage and adjustable maximum current limiting.

Voltage regulated power supplies have desirable characteristics for many applications and are widely used especially in the field of electronics. U.S. Patent No. 3,028,538, granted on April 3, 1962, for example, shows and describes a voltage regulated power supply utilizing a controlled series pass device and a bridge-like control system. The voltage drop across a voltage control resistor is compared with the output voltage of the power supply and the series pass device is controlled by an error amplifier excited by the output of the bridge circuit. There are many applications as, for example, in transistor circuit work, where it is desirable to set a limit to the current which the power supply will provide to prevent circuit damage or overload. One circuit which has been used for limiting this maximum current is shown and described in copending application for Letters Patent entitled "Protective System for Transistors" filed by Aaron Rosenfeld et al. on Aug. 1, 1958 and bearing Serial No. 752,579, now Patent No. 3,131,344.

According to the present invention a much more sensitive and also adjustable means is provided for determining the maximum current which a voltage regulated power supply can provide to an external circuit. The increased sensitivity permits setting the maximum current much closer to the actual working current of the external circuit and thereby providing much greater circuit protection in case of overload conditions. Meter checking means is also provided to permit quickly and accurately setting this maximum output current and without disturbing the output voltage setting at this time.

Accordingly the main object of the present invention is to provide a method of and means for controlling and pre-setting the maximum current which can be drawn from a voltage regulated power supply.

Another object is to provide an improved and more sensitive maximum current or overload current control circuit.

Still another object is to provide an improved maximum current determining circuit in a hybrid regulated power supply.

A further object is to provide a method of and means for setting the maximum current limit in an adjustable output regulated power supply regardless of and without disturbing a particular output voltage setting.

These and other objects will be apparent from the detailed description of the invention given in connection with the various figures of the drawing.

Figure 2:
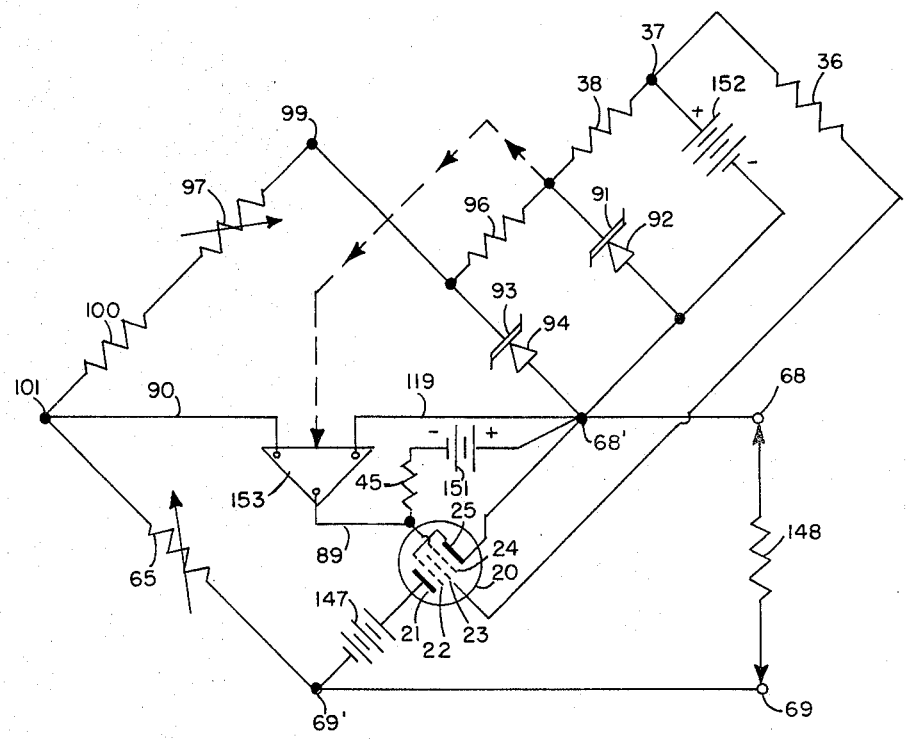

In the drawing:
FIGURE 1 is a schematic circuit diagram of the preferred form of the present invention.
FIGURE 2 is a simplified schematic representation of the circuit of FIG. 1.

In FIG. 1 is shown an alternating current power transformer including a magnetic core 7, a primary winding 6 and secondary windings 8, 9, 10 and 11. The primary is connected over leads 4 and 5, through fuse 3 and control switch 2 to a power line plug 1. Neon lamp 12 is provided as an indicator to show when the power supply is turned on. Winding 9 is provided as a suitable A.C. source of 6.3 volts for external use at terminals 54 and 55 on the terminal strip 53. Winding 11 supplies current to heater 26 of tube 20. The main source of voltage to be regulated is supplied by winding 8. The A.C. from winding 8 is rectified by rectifiers 16 and 17 connected to terminals 15 and 14. The D.C. thus produced is smoothed by capacitor 18 connected between lead 19 and the center tap 13 of winding 8. Auxiliary bias voltages are supplied by winding 10. One bias voltage is provided by rectifiers 31 and 33, by-passed by capacitors 32 and 34, to smoothing capacitor 39. The bias voltage thus provided appears between leads 44, connected to the positive side of the system, and lead 35, and is used to supply screen voltage to tube 20 through resistor 36 and from junction 37 over resistor 38 to lead 95 of the reference voltage and error amplifier circuits to be explained in more detail below. The other auxiliary bias supply utilizes rectifier 41 and smoothing capacitor 40 and supplies control grid bias to control grid 24 of tube 20 through resistors 45 and 149 and over leads 46 and 89 and link 60 shorting terminals 59 and 61 on terminal strip 53.

The thermionic vacuum tube 20 is utilized as a controlled series pass device although it will be understood that a transistor could be used with some suitable circuit modifications. Tube 20 is a suitable tube such as a pentode having plate 21, suppressor grid 22 connected to cathode 25 which in turn is heated by heater 26, screen grid 23 and control grid 24. The current to be controlled passes from lead 19, through tube 20, through resistors 47 and 48 and over lead 52 to terminal 56 and main output terminal 68.

For an easier understanding of the invention reference is now made to the simplified circuit of FIG. 2 where similarly numbered parts correspond with those shown in FIG. 1. In FIG. 2 the basic circuit is drawn in the form of a bridge having four terminals, namely, 68', 69', 101 and 99 with four arms interconnecting them. One arm consists in the series pass tube 20 connected in series with a voltage or current source here represented by battery 147 but which is to be taken to represent the main current source of FIG. 1 (between leads 19 and 43) and connected between terminals 68' and 69' across which the external load 148 is also connected. The screen voltage supply for tube 20 described above is shown in simplified form as battery 152 and is connected to screen 23 through resistor 36. The control grid bias for tube 20 described above is shown in simplified form as battery 151 and is connected to grid 24 through resistor 45. Two arms of the bridge, those between terminals 101 and 99 and between terminals 99 and 68' may be considered as fixed reference arms. The arm between terminals 68' and 99 comprises a fixed reference voltage as determined by Zener diode 93–94 which is supplied with a regulated current provided from battery 152 which dropping through resistor 38 establishes a constant regulated voltage across Zener diode 91–92 which in turn supplies a constant current to Zener diode 93–94 through fixed resistor 96. The arm between terminals 99 and 101 consists in resistors 97 and 100 connected in series and supporting a voltage drop substantially equal to the reference voltage across Zener diode 93–94 at balance. Since, when the bridge circuit is balanced, the drop across resistors 97 and 100 is equal to the reference voltage, this arm determines the bridge current and hence the current flowing through voltage control resistor 65. Again at balance the voltage across voltage control resistor 65 will be substantially equal to the voltage across the load arm of the bridge, terminals 68' and 69'. With the bridge current determined as set forth above, the regulated output voltage will thus be proportional to the resistance of variable resistor 65. The bridge is kept automatically balanced by error amplifier 153 connected over leads 90 and 119 to terminals 101 and 68' respectively and delivering a balancing output control signal over lead 89 to control grid 24. This error amplifier in conjunction with series pass tube 20 operates to automatically keep the potential between terminals 101 and 68' substantially equal and hence the bridge in balance. Details of the error amplifier and reference voltage system are shown in FIG. 1 and will now be described in detail.

The bridge circuit above described in connection with FIG. 2 can be identified in FIG. 1 by tracing the various parts and circuits bearing the corresponding numbers. The error amplifier 153 of FIG. 2 is shown in detail in one possible form in FIG. 1 where it includes transistors 105, 111, 120, 128 and 139. The first or input transistor 105 having base 106, emitter 107 and collector 108 is connected as an emitter follower with resistor 109 connected between emitter 107 and line 95. This connection causes PNP transistor 105 to present a relatively high impedance at its input, base 106 to collector 108 which are connected through resistor 102 to bridge point 101 and to bridge point 68 over line 119 respectively. The second transistor 111 is an NPN transistor having a base 112, emitter 113 and collector 114. Base 112 is directly connected to emitter 107 for providing signal transfer from the first to the second transistor. Collector 114 is connected through load resistor 115 to line 95. Emitter 113 is connected over line 136 to junction point 137 between resistors 135 and 138 at which point a small positive voltage is maintained due to current from emitters 130 and 141. The voltage at point 137 is maintained at a fraction of a volt and sufficient to maintain a small net bias between emitter 107 and collector 108 and between base 106 and emitter 107. These various voltages are related by the equation:

$$Vcb1 = Ve2 + Vbe2 - Vbe1$$

where; $Vcb1$ is the collector to base voltage of transistor 105, $Ve2$ is the bias voltage between point 137 and line 119, $Vbe2$ is the voltage between base 112 and emitter 113 and $Vbe1$ is the voltage between base 106 and emitter 107. It has been found that the resulting small forward bias which is a small fraction of a volt permits the bridge circuit to regulate the output voltage even when the output voltage is very small and approaching zero. The bias at point 137 is also to be slightly greater than the difference between the base to emitter voltages of the first two transistors in case they are not exactly matched in this respect.

The third transistor in the amplifier is PNP 120 also connected as an emitter follower to present a high input impedance to transistor 111 and a low output impedance to transistor 111 and a low output impedance to transistor 128. Base 121 is directly connected to collector 114, collector 122 is connected to line 119 and emitter 123 is connected through load resistor 124 to line 95. A roll off circuit consisting of resistor 117 in series with capacitor 118 is connected from base 121 to line 119 in order to cut the high frequency response of the amplifier and thus prevent high frequency instability or oscillation.

The fourth transistor is PNP 128 driven at base 129 with signals from emitter 123 conducted through resistor 125. Emitter 130 is returned to line 119 through resistors 135 and 138 connected in series. Collector 131 controls grid 24 of pass tube 20 to which it is connected over line 89, link 60 and resistor 149. The resistor 125 is used in order to provide a point 127 at base 129 which can be controlled by a signal in addition to the bridge control signals traversing the amplifier as will be explained in more detail below. Capacitor 126 is provided across resistor 125 in order to pass sudden changes in bridge signal and thus to speed up the response of the control system. The amplifier consisting of these first four transistors receives error signals from the bridge and provides amplified control signals to grid 24 of the pass tube in order to keep the bridge balanced and to thus regulate the output voltage of the system.

The NPN transistor 139 is used as a clamp to provide a stiff bias emitter 130. Collector 140 is connected to bias line 95, base 142 is connected to adjustable contact 146 on potentiometer 144 which in turn is connected between resistors 143 and 145 bridged from line 95 to line 119. The setting of contact 146 determines the voltage at emitters 141 and 130 since the circuit is an emitter follower circuit. This adjustment is used to set the maximum current which can be drawn from the power supply as will be described in detail below.

Turning now to the current limiting features of the present invention the function of resistors 47 and 48 will be described. It will be seen that any current flowing in these resistors will establish a voltage drop in such a direction as to make lead 150 positive with respect to lead 119. This positive voltage drop is applied to base 129 through diode 132–133 in its conducting direction, i.e. the polarity which makes anode 133 positive with respect to cathode 132. As was stated above the insertion of resistor 125 in series with base 129 permits an over riding signal to be applied to base 129. When this voltage across resistors 47 and 48 exceeds the forward bias on base 129 plus the forward voltage necessary to establish conduction through diode 132–133, transistor 128 will no longer be driven by the normal amplified bridge signals and will start to cut-off its collector current so that line 89 receiving negative voltage through resistor 45 over line 46 will start going more negative and grid 24 will receive more bias tending to reduce output current. Resistor 48 is shown adjustable by means of movable contact 49 connected to point 51 by lead 50. If contact 49 is moved so that resistor 48 is entirely shorted out, resistor 47 alone is effective in the current limiting circuit. Resistor 47 is chosen to cause the current to limit at some nominal value above the maximum rated output current of the power supply. This may be, for example, at 125 percent of rated maximum output current. With resistor 47 chosen and fixed, a final adjustment of the current limiting point may be made with adjustable contact 146 which through transistor 139 determines the bias of transistor 128 and hence the voltage to be overcome by the drop through resistor 47. In order to be able to set the maximum current at lower values, contact 49 is moved toward point 51 introducing an increasing amount of resistor 48 into the maximum current control circuit. In this manner the maximum output current may be reduced to practically any desired value and even to a small percentage of the maximum rated current of the power supply.

Metering of output voltage, output current and the maximum current is provided by meter 71 and the four circuit, three position switch 72, 73, 74, 75 etc. shown in its first position. With the switch arms in their uppermost position (first position) meter 71 measures output voltage since arm 72 switches one side of the meter to plus line 52 and arm 73 to contact 76 connects the other side of the meter through voltage multiplier resistor 84 to negative line 67. In the middle switch position (second position) arm 72 connects on side of the meter over lead 80 to one side of current shunt resistor 81 in the negative line of the power supply and arm 73 connects the other side of the meter over contact 77 to point 82 and the other side of current shunt 81 so that the meter reads the current being drawn from the power supply. In the lower position (third position) of the switch arms circuits are set up for reading the maximum limited current from the power supply so that it may be set by adjusting resistor 48 regardless of the voltage setting of the control resistor 65. This third switch position may be a momentary position since it is not necessary to have the switch stay in this position except for a time sufficient to make the setting. Arm 74 connects a load resistor 79 across the power supply terminals 68–69 and is of such a value as to permit drawing the maximum controlled current from the supply. Arm 75 substitutes resistor 85 for the normal voltage control resistor 65 and is of such value as to insure sufficient output voltage to establish the maximum output current. Arm 72 and arm 73 to contact 78 maintain meter 71 in current measuring connection across current shunt 81. Now with the switch in this third position, arm 49 is moved until the output current limits at the desired value after which the switch is released and normal operation of the power supply can be continued.

While only one form of the present invention has been shown and described, many modifications will be apparent to those skilled in the art and within the spirit and scope of the invention as set forth in particular in the appended claims.

What is claimed is:

1. In a regulated power supply, the combination of a source of power to be regulated, a pair of output terminals to be connected to a device to be supplied with regulated power, a signal responsive pass device and a resistor in series connected between said source of power and one of said output terminals, a multi-stage error amplifier coupled to said output terminals and feeding control signals to said pass device, and a substantially unilateral coupling device connected between the signal responsive pass device end of said resistor and an intermediate stage of said error amplifier for limiting signals traversing said amplifier in response to a predetermined level of current traversing said resistor.

2. A regulated power supply as set forth in claim 1 wherein said unilateral coupling device is a semi-conductor diode.

3. A regulated power supply as set forth in claim 1 wherein said resistor is adjustable.

4. A regulated power supply as set forth in claim 1 wherein said pass device is a thermionic vacuum tube.

5. A regulated power supply as set forth in claim 1 wherein said multi-stage amplifier is a transistor amplifier.

6. A regulated power supply as set forth in claim 1 wherein said intermediate stage connection of said unilateral device is at the input to the last stage of said error amplifier.

References Cited by the Examiner
UNITED STATES PATENTS

| | | | |
|---|---|---|---|
| 2,668,272 | 2/1954 | Groth | 323—22 |
| 2,697,811 | 12/1954 | Deming | 323—22 |
| 2,912,635 | 11/1959 | Moore | 322—5 |
| 3,105,188 | 9/1963 | Harrison | 323—22 |
| 3,113,260 | 12/1963 | Wiley | 323—4 |

LLOYD McCOLLUM, *Primary Examiner.*

GEORGE J. BUDOCK, *Examiner.*

K. D. MOORE, K. W. HADLAND, *Assistant Examiners.*